United States Patent
Albinger

(10) Patent No.: US 11,808,243 B2
(45) Date of Patent: Nov. 7, 2023

(54) STARTER SOLENOID CONTACT HEALTH MONITOR

(71) Applicant: HUSQVARNA AB, Huskvarna (SE)

(72) Inventor: Matthew Albinger, Shelby, NC (US)

(73) Assignee: HUSQVARNA AB, Huskvarna (SE)

( * ) Notice: Subject to any disclaimer, the term of this patent is extended or adjusted under 35 U.S.C. 154(b) by 90 days.

(21) Appl. No.: 17/600,367

(22) PCT Filed: Oct. 30, 2019

(86) PCT No.: PCT/IB2019/059307
§ 371 (c)(1),
(2) Date: Sep. 30, 2021

(87) PCT Pub. No.: WO2021/038286
PCT Pub. Date: Mar. 4, 2021

(65) Prior Publication Data
US 2022/0252032 A1    Aug. 11, 2022

Related U.S. Application Data

(60) Provisional application No. 62/893,848, filed on Aug. 30, 2019.

(51) Int. Cl.
*F02N 11/10* (2006.01)
*F02N 11/08* (2006.01)

(52) U.S. Cl.
CPC ........ *F02N 11/108* (2013.01); *F02N 11/0859* (2013.01); *F02N 11/0862* (2013.01);
(Continued)

(58) Field of Classification Search
CPC .................................................... F02N 11/108
See application file for complete search history.

(56) References Cited

U.S. PATENT DOCUMENTS 4,412,137 A * 10/1983 Hansen ............... F02N 11/0866
307/10.6
4,906,857 A * 3/1990 Cummins ............. F02N 11/087
361/33
(Continued)

FOREIGN PATENT DOCUMENTS

DE 102011080203 A1 * 2/2012 ............ F02N 11/087
DE 102012204787 A1 * 9/2012 ............ F02N 11/087
(Continued)

OTHER PUBLICATIONS

International Search Report and Written Opinion for International Application No. PCT/IB2019/059307 dated Jan. 28, 2020.

*Primary Examiner* — Kevin R Steckbauer
(74) *Attorney, Agent, or Firm* — Burr & Forman LLP

(57) ABSTRACT

An ignition system for outdoor power equipment driven by a petrol or gasoline engine may include a safety interlock system, a starter motor, a starter solenoid having an activation coil, and a solenoid monitor. The ignition system may be configured to selectively apply power to start the engine based on application of a start attempt. The safety interlock system may be operable to actuate the starter solenoid via the activation coil to apply current to the starter motor for starting the engine during the start attempt. The solenoid monitor may be configured to determine a status of the activation coil and starter solenoid contacts and provide a fault indication based on the status determined.

18 Claims, 5 Drawing Sheets

(52) U.S. Cl.
CPC .. *F02N 2200/043* (2013.01); *F02N 2200/063* (2013.01); *F02N 2250/02* (2013.01)

(56) References Cited

U.S. PATENT DOCUMENTS

| | | | |
|---|---|---|---|
| 8,055,460 | B2 | 11/2011 | Rajagopalan et al. |
| 8,671,786 | B2 * | 3/2014 | Notani .................... F02N 15/02 |
| | | | 74/7 A |
| 8,792,222 | B2 * | 7/2014 | Grupido .................. B60L 50/52 |
| | | | 361/160 |
| 8,831,815 | B2 | 9/2014 | Lott et al. |
| 8,861,161 | B2 * | 10/2014 | Grupido ................ B60L 3/0084 |
| | | | 361/91.1 |
| 8,901,934 | B2 * | 12/2014 | Namou .............. G01R 31/3278 |
| | | | 324/423 |
| 8,994,210 | B2 * | 3/2015 | Basheer .................. B60L 58/21 |
| | | | 307/10.1 |
| 9,024,468 | B2 * | 5/2015 | Basheer .................. B60L 58/21 |
| | | | 307/9.1 |
| 9,050,893 | B2 * | 6/2015 | Grupido .................. B60L 50/51 |
| 9,162,579 | B2 * | 10/2015 | Grupido .................. B60L 50/51 |
| 9,759,760 | B2 | 9/2017 | Leif |
| 9,765,746 | B2 | 9/2017 | Ghoneim et al. |
| 10,058,031 | B1 | 8/2018 | Brown et al. |
| 10,170,259 | B2 * | 1/2019 | Katrak .................... H01H 47/32 |
| 10,215,148 | B2 | 2/2019 | Jiang et al. |
| 11,168,658 | B2 * | 11/2021 | Cansever .............. F02N 11/087 |
| 2005/0236900 | A1 * | 10/2005 | Kahara ................. F02N 11/108 |
| | | | 307/10.1 |
| 2011/0203410 | A1 * | 8/2011 | Notani .................... F02N 15/02 |
| | | | 74/7 R |
| 2012/0105065 | A1 * | 5/2012 | Namou .............. G01R 31/3278 |
| | | | 324/415 |
| 2013/0009464 | A1 * | 1/2013 | Firehammer ......... H02J 7/0031 |
| | | | 307/140 |
| 2014/0278020 | A1 | 9/2014 | Neet |
| 2017/0365430 | A1 * | 12/2017 | Katrak .................... B60R 16/03 |
| 2021/0270222 | A1 * | 9/2021 | Cansever ............. F02N 11/0848 |
| 2022/0252032 | A1 * | 8/2022 | Albinger .............. F02N 11/0862 |

FOREIGN PATENT DOCUMENTS

| | | | | |
|---|---|---|---|---|
| DE | 102011076914 | A1 * | 12/2012 | .............. F02N 11/08 |
| DE | 102018108102 | A1 * | 10/2019 | |
| FR | 3028894 | A1 * | 5/2016 | ......... F02N 11/0814 |
| JP | 2004116306 | A * | 4/2004 | ........... F02N 11/108 |
| JP | 3816047 | B2 * | 8/2006 | ........... F02N 11/108 |
| KR | 2002022181 | A * | 3/2002 | ........... F02N 11/108 |
| WO | 2016090185 | A1 | 6/2016 | |
| WO | 2016097893 | A1 | 6/2016 | |
| WO | WO-2021038286 | A1 * | 3/2021 | ......... F02N 11/0859 |

\* cited by examiner

STARTER SOLENOID CONTACT HEALTH MONITOR

CROSS REFERENCE TO RELATED APPLICATION

This application claims priority to U.S. application No. 62/893,848 filed Aug. 30, 2019, the entire contents of which are hereby incorporated by reference in its entirety.

TECHNICAL FIELD

Example embodiments generally relate to outdoor power equipment and, more particularly, some embodiments relate to a device and/or method for monitoring the contact health of the starter solenoid of an ignition system of a lawn care vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Starting systems for many handheld or walk behind outdoor power equipment devices are based on a recoil start (or pull start). In such a device, a rope with a grip at the end is coiled around a mechanism that is coupled to an end of the crankshaft. When the rope is pulled to cause uncoiling, the crankshaft spins to crank the engine. Larger pieces of equipment such as riding lawn mowers more commonly employ electric starters. Electric starters are generally used by larger pieces of equipment since the electric starting motor (or starter motor) of such devices typically requires battery power that is more practically supportable by a larger device. A common electric starter may include a starter solenoid. A switch (e.g., key operated or keyless) is typically used to apply battery power to the solenoid. Application of power to the solenoid through the switch closes high current contacts for the starter motor to cause it to turn for a limited period of time to start the engine.

When the engine will not start, there can be a number of different reasons. One issue that may contribute to such a situation is the failure of the starter solenoid. If there was a way to quickly and confidently determine not only whether the issue is indeed the starter solenoid, but also specifically at what portion of the starter solenoid the failure has occurred, significant savings in terms of cost, replacement parts, time and energy could be obtained. Thus, it may be desirable to provide an improved mechanism for monitoring the health of the starter solenoid.

BRIEF SUMMARY OF SOME EXAMPLES

Some example embodiments may provide an ignition system for outdoor power equipment driven by a petrol or gasoline engine. The ignition system may include a safety interlock system, a starter motor, a starter solenoid having an activation coil, and a solenoid monitor. The ignition system may be configured to selectively apply power to start the engine based on application of a start attempt. The safety interlock system may be operable to actuate the starter solenoid via the activation coil to apply current to the starter motor for starting the engine during the start attempt. The solenoid monitor may be configured to determine a status of the activation coil and starter solenoid contacts and provide a fault indication based on the status determined.

In another example embodiment, a riding lawn care device may be provided. The riding lawn care device may include an engine to selectively power the device, a frame supporting the engine of the device, and an ignition system for selectively applying power to start the engine based on application of a start attempt. The ignition system may include a safety interlock system, a starter motor and a starter solenoid having an activation coil. The safety interlock system may be operable to actuate the starter solenoid via the activation coil to apply current to the starter motor for starting the engine during the start attempt. The ignition system further includes a solenoid monitor configured to determine a status of the activation coil and starter solenoid contacts and provide a fault indication based on the status determined.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
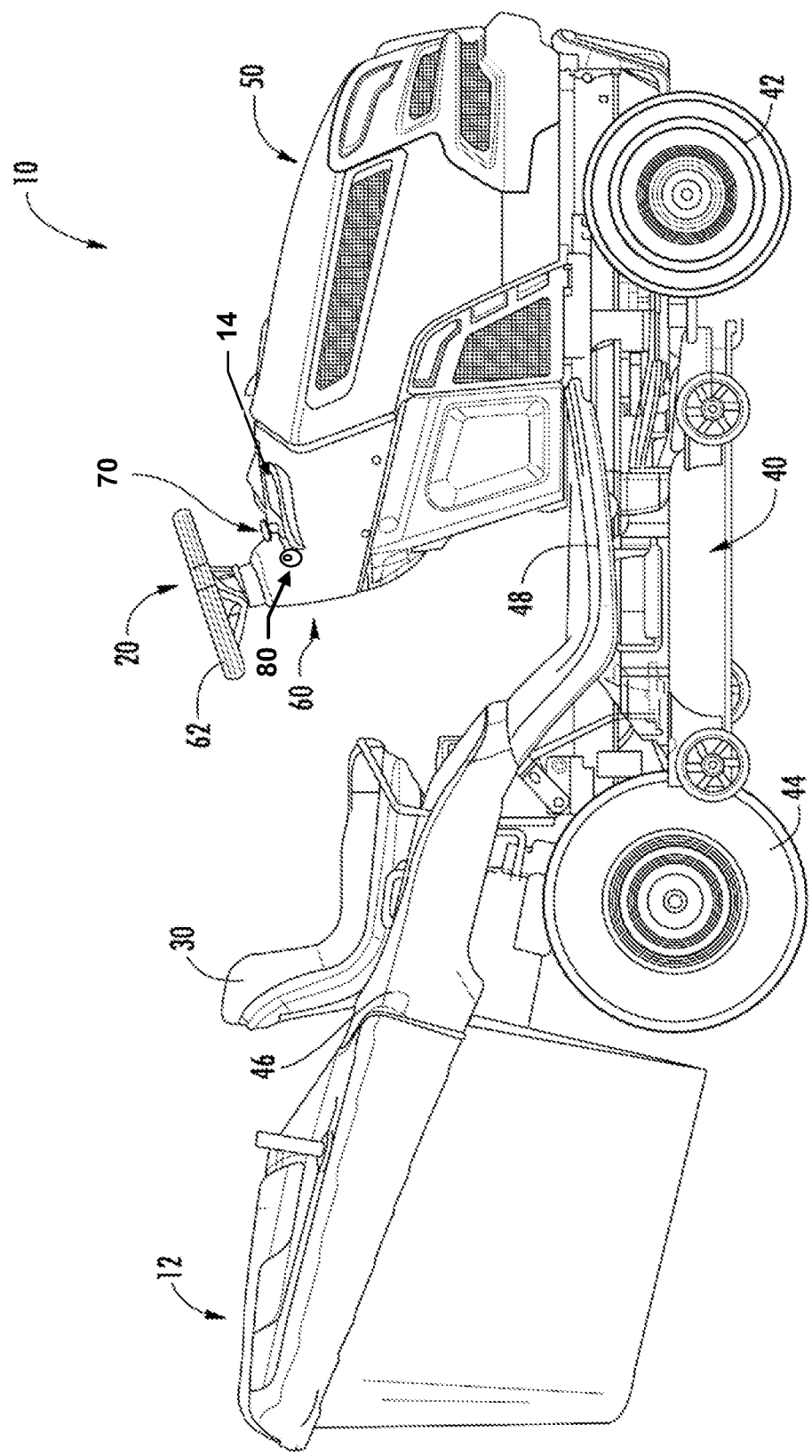
FIG. 1 illustrates a perspective view of the riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

When a microprocessor is introduced into an ignition interface, the potential for employing additional functionality into the control and monitoring capabilities associated with the ignition interface may be increased. For example, by providing a number of sensor and/or safety switch inputs to the microprocessor, the corresponding inputs may be monitored to try to determine certain situations for which intervention or other functional activity may be desired. One such situation may be a determination as to the health of the starter solenoid.

A typical microprocessor-based system relies upon the microprocessor to assess situations and take actions. The ability to use a microprocessor for initiating various actions can often reduce part count and increase functional capabilities at the same time. Thus, there is significant motivation to rely on the microprocessor for as much control as possible. Within this context, the microprocessor is typically programmed to assess various sensor and/or switch positions to determine the status of corresponding components and make decisions regarding whether to initiate any applicable actions. The actions may include, in some cases, shutting down certain components or shutting down the entire device. However, the microprocessor could also be programmed to monitor certain components and make fault determinations that can be passed on to the operator.

Starter solenoids that are not part of the engine have been common in consumer level gas powered products of all types. These starter solenoids generally have at least two particular locations of potential failure that could be monitored by provision of specific inputs and corresponding programming to the microprocessor. The first of these locations is the solenoid activation coil, and the second is the input/output contacts themselves on the high current side of the device. When the unit will not start, knowing whether the issue is the starter solenoid, and specifically the fault location therein, would save a great deal of confusion and potentially also prevent automatic replacement of parts that are not the issue, but nevertheless part of a troubleshooting process that proceeds without the information that will now be available when example embodiments are employed. In this regard, it is not uncommon for the battery or even the starter motor to be replaced before the starter solenoid is replaced, which may cause significant frustration and expense.

Some example embodiments have therefore been provided to establish circuitry and programming to enable the monitoring of the health of the starter solenoid. Moreover, some example embodiments actually enable specific fault conditions to be detected and, in some cases, provision of an indication of the detected fault to be provided to the operator or a maintenance technician.

FIG. 1 illustrates an example lawn care device in the form of a riding lawn care vehicle 10 having a bagging attachment 12. However, it should be appreciated that example embodiments may be employed on numerous other riding lawn care vehicles that may not include a bagging attachment 12. The riding lawn care vehicle 10 may include an operations panel 14 that may display operational information regarding the riding lawn care vehicle 10 and host various controls, gauges, switches, lights, displays, and/or the like. As shown and described herein, the riding lawn care vehicle 10 may be a riding lawn mower (e.g., a lawn tractor, front-mount riding lawn mower, riding lawn mower with a zero or near zero degree radius of turn, cross mower, stand-on riding lawn mower, and/or the like). However, example embodiments may also or alternatively be employed on other outdoor power equipment devices, such as walk behind lawn mowers, tillers, snow throwers, and/or the like.

The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear, or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases, the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments, the shafts are coupled to a motor via a system of belts and pulleys. In other embodiments, the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control-related components such as one or more speed controllers, brakes, cutting height adjusters, and/or the like. Some of the controllers, such as the speed controllers and/or brakes, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

In an example embodiment, the engine 50 may turn at least one shaft that is coupled to corresponding ones of one or more cutting blades within the cutting deck 40 via a PTO clutch. When the PTO clutch is engaged, rotary power generated by the engine 50 may be coupled to the one or more cutting blades to cause rotation thereof (e.g., for cutting grass). When the PTO clutch is disengaged, rotary power generated by the engine 50 may not be coupled to the one or more cutting blades and thus the cutting blades may not rotate. In some embodiments, engagement of the PTO clutch may be accomplished via operation of a PTO switch 70 that may be disposed on or proximate to the operations panel 14.

The operations panel 14, or some other portion of the steering assembly housing 60, may also provide support for an ignition interface 80. The ignition interface 80 may be used for starting the engine 50 and for controlling other functions of the riding lawn care vehicle 10. In an example embodiment, the ignition interface 80 may or may not require a key to operate. Thus, the operator of the riding lawn care vehicle 10 may be enabled to start and/or initiate one or more functional capabilities of the riding lawn care vehicle 10 either with or without the use of a physical key using the ignition interface 80.

Figure 2:
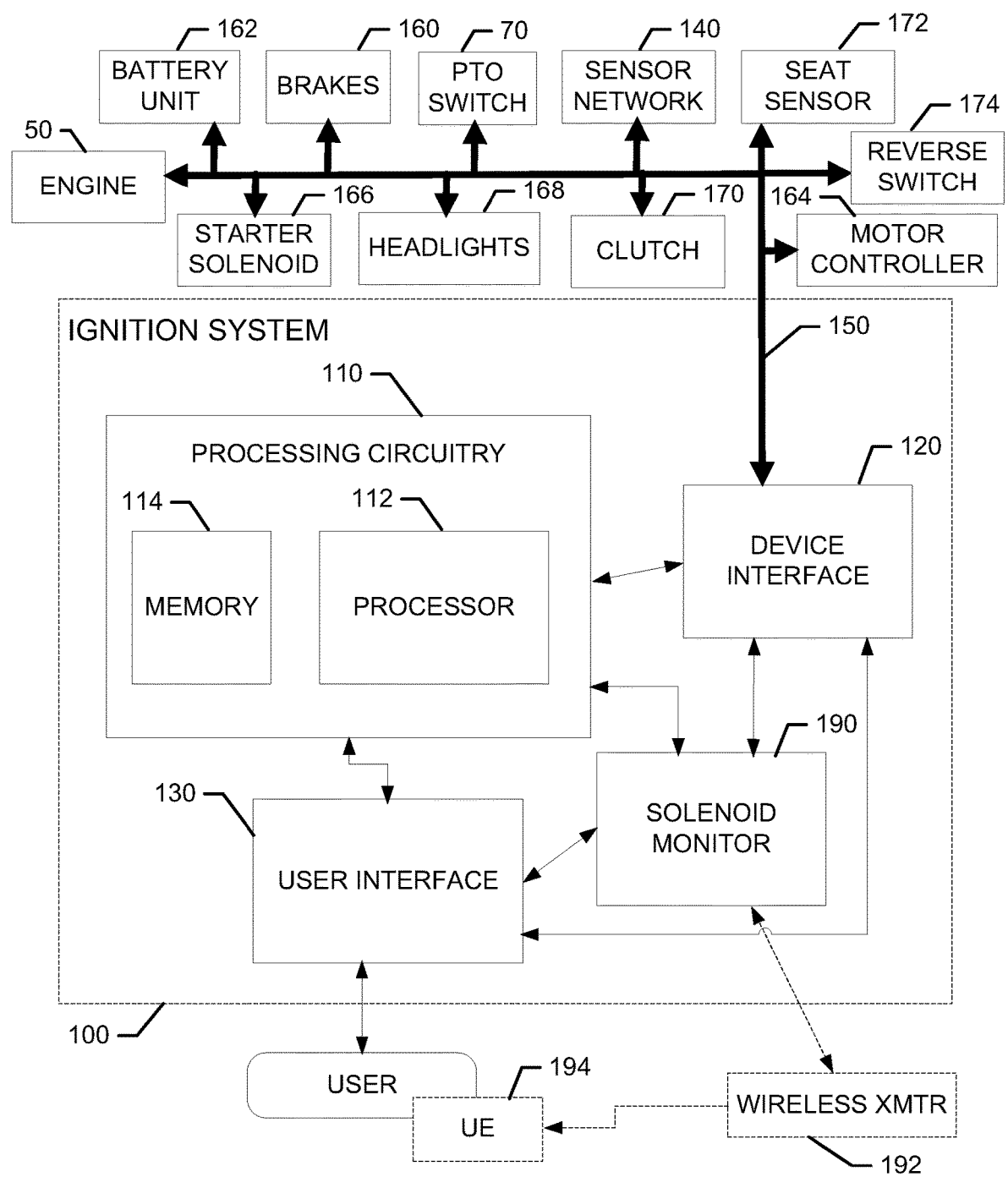
FIG. 2 illustrates a functional block diagram for explaining the operation of an ignition system of an example embodiment.

FIG. 2 illustrates a functional block diagram for explaining the operation of an ignition switch-driven electrical wiring system of an example embodiment. The ignition switch-driven electrical wiring system is an example of a starting system for a gasoline or petrol engine, and will be referred to hereinafter as ignition system 100. As shown in FIG. 2, the ignition system 100 may include processing circuitry 110 to control starting of the engine 50 of the riding lawn care vehicle 10 of an example embodiment as described herein. In this regard, for example, the ignition system 100 may utilize the processing circuitry 110 to provide electronic control inputs to one or more functional units of the riding lawn care vehicle 10 and to process data generated by the one or more functional units regarding various operational parameters relating to the riding lawn care vehicle 10. The processing circuitry 110 may be configured to perform data processing, control function execution, and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein. In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software, or a combination of hardware and software) to perform operations described herein. However, in some embodiments, the processing circuitry 110 may be embodied as a portion of an on-board computer. In some embodiments, the processing circuitry 110 may communicate with electronic components and/or sensors of a sensor network 140 (e.g., sensors that measure variable values related to riding lawn care vehicle parameters) of the riding lawn care vehicle 10 via a single data bus (e.g., data bus 150), which may form a portion of the device interface 120 or which may connect to the device interface 120. As such, the data bus 150 may connect to a plurality or all of the sensors, switching components, and/or other electrically-controlled components of the riding lawn care vehicle 10 to the processing circuitry 110.

In an example embodiment, the data bus 150 may further provide a mechanism by which the processing circuitry 110 can interface with or control other functional units of the riding lawn care vehicle 10. For example, in some embodiments, the data bus 150 may provide control inputs to and/or receive status inputs from functional units such as any or all of the engine 50, PTO switch 70, brakes 160 (which may include a parking brake), a battery unit 162, one or more motor controllers 164, a starter solenoid 166, headlights 168, clutch 170, seat sensor 172, reverse switch 174, and/or the like.

The user interface 130 may be in communication with the processing circuitry 110 to receive an indication of a user input at the user interface 130 and/or to provide an audible, visual, mechanical, or other output to the user. As such, the user interface 130 may include, for example, a display, one or more levers, switches, buttons or keys (e.g., function buttons), and/or other input/output mechanisms. In an example embodiment, the user interface 130 may include the ignition interface 80, which may further include a plurality of light indicators, a plurality of function buttons, and/or a simple display.

The light indicators may be LEDs or LED backlit images that are lit or unlit to indicate corresponding status information. The information indicated by the light indicators may be directly related to the corresponding function buttons in some cases. However, in other cases, some of the light indicators may indicate status information associated with other functional units (e.g., those connected to the data bus 150). Meanwhile, the function buttons may be employed for initiation of various control operations to actuate or turn off corresponding ones of the functional units. However, in an example embodiment, the function buttons may also have an alternative functionality associated with starting of the engine 50.

The device interface 120 may include one or more interface mechanisms for enabling communication with other devices (e.g., sensors of the sensor network 140 and/or other accessories or functional units such as motors, engines, servos, switches, or other operational control devices for providing control functions). In some cases, the device interface 120 may be any means such as a device or circuitry embodied in either hardware, or a combination of hardware and software that is configured to receive and/or transmit data from/to sensors in communication with the processing circuitry 110 via the data bus 150. Thus, for example, the device interface 120 may provide interfaces for communication of components of the riding lawn care vehicle 10 via the data bus 150.

The processor 112 may be embodied in a number of different ways. For example, the processor 112 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA, or the like, the processor 112 may be specifically configured hardware for conducting the operations described herein. Alternatively, as another example, when the processor 112 is embodied as an executor of software instructions, the instructions may specifically configure the processor 112 to perform the operations described herein.

The ignition system 100 may further include a solenoid monitor 190 of an example embodiment. The solenoid monitor 190 may be any means or device configured to perform the corresponding functionality of the solenoid monitor 190 as described herein. In some cases, the solenoid monitor 190 may include circuitry embodied in either hardware, or a combination of hardware and software that is configured to receive data provided from specific contacts or locations associated with the starter solenoid 166 and determine fault status information or otherwise perform health status monitoring for the starter solenoid 166 based on the data in order to provide a corresponding output to the user.

In an example embodiment, the processor 112 (or the processing circuitry 110) may be embodied as, include, or otherwise control the operation of the ignition system 100 based on inputs received by the processing circuitry 110 responsive to positioning of the function buttons and/or the operation of various ones of the functional units. As such, in some embodiments, the processor 112 (or the processing circuitry 110) may be said to cause each of the operations described in connection with the ignition system 100 in relation to operation of the functional units and/or function buttons to undertake the corresponding functionalities responsive to execution of instructions or algorithms configuring the processor 112 (or processing circuitry 110) accordingly. In an example embodiment, the processor 112 may be physically located within a body that houses the electronics for the ignition interface 80, and the processor 112 may be the processor for the entire riding lawn care vehicle 10.

In an exemplary embodiment, the memory 114 may include one or more non-transitory memory devices such as, for example, volatile and/or non-volatile memory that may be either fixed or removable. The memory 114 may be configured to store information, data, applications, instructions, or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 110, functional units, and/or the function buttons. Among the contents of the memory 114, applications may be stored for execution by the processor 112 in order to carry out the functionality associated with each respective application. In some cases, the applications may include instructions for determining certain contact status or other conditions based on various input signals related to monitoring the health of the starter solenoid 166 as described herein.

In an example embodiment, various ones of the functional units may impact each other. For example, the PTO switch 70 (which may be an electric or manual switch) may be used to alter a position of the clutch 170. Likewise, the motor controller 164 (if employed) may impact the application of battery power from the battery unit 162 to either a drive motor or a cutting motor. The position of the starter solenoid 166 may impact operation of the engine 50. Inputs regarding position of the brakes 160 and/or the PTO switch 70 may impact operation of the clutch 170, engine 50, and/or the like. Battery unit 162 status, status of the headlights 168, and/or other sensor network component status may be reported to and/or controlled by operation of the function buttons 134. Accordingly, it should be appreciated that the ignition system 100 of an example embodiment, and particularly the data bus 150 and the processing circuitry 110 may enable the user interface 130 to provide a relatively robust interface mechanism for controlling starter operation and numerous other functions of the riding lawn care vehicle 10.

In some embodiments, the solenoid monitor 190 may continuously or periodically monitor voltages or currents present at terminals of the starter solenoid 166 in order to enable automated health monitoring and troubleshooting. However, in some cases, the periodicity of such monitoring may directly coincide with start attempts (i.e., start attempts or requests for starting the engine 50). As such, for example, detecting the voltages or currents and corresponding calculations or determinations regarding fault status of the starter solenoid 166 may be triggered responsive to a start attempt. However, some faults (such as detecting a stuck contact in the starter solenoid 166) may be detectable even when a start attempt is not initiated. Thus, monitoring may also occur or be triggered between start attempts in some cases, and a time since last check, or other temporally dependent trigger may be used for initiating monitoring activities. The solenoid monitor 190 may log or record the voltages or currents detected when triggered, along with details regarding any calculations or determinations made for fault status in the memory 114.

The troubleshooting capabilities of the solenoid monitor 190 may be the result of the execution of instructions (e.g., via the processor 112) associated with the performance of troubleshooting algorithms that can be programmed. In an example embodiment, the solenoid monitor 190 may be configured to determine fault status as a binary choice between a no fault condition or a fault condition, and provide an indication of such determination via the user interface 130 (e.g., through operations panel 14 of the riding lawn care vehicle 10). However, in other cases, more detailed information about the fault itself may be determined and/or communicated to the user by the solenoid monitor 190 either proactively or in response to a request from the user. For example, the solenoid monitor 190 may utilize the detected voltages or currents present at the terminals of the starter solenoid 166 to execute troubleshooting algorithms that can identify specific component failures or potential maintenance related issues. Those component failures or maintenance related issues can then be communicated to the user (proactively or responsive to a request) via the user interface 130.

In some cases, either in addition or as an alternative to providing fault status information via the user interface 130, the solenoid monitor 190 may utilize external devices for fault status information reporting. For example, the solenoid monitor 190 may include or otherwise be in communication with a wireless transmitter 192. The wireless transmitter 192 may be configured to employ wireless communication to send messages regarding fault status determinations to user equipment (UE) 194 of the user as shown in FIG. 2. The UE 194 could be a cell phone, computer, or any other electronic communication device of the user (e.g., an operator of the riding lawn care vehicle 10 or a technician or fleet manager). In an example embodiment, the solenoid monitor 190 may provide some or all fault status determinations via the wireless transmitter 192. However, in other cases, the wireless transmitter 192 may only be utilized when a fault is detected, or when faults of at least a certain level of concern are detected.

In addition to providing messages regarding messages regarding fault status determinations, the solenoid monitor 190 may also be configured to perform engine shutdowns based on the fault status determinations. For example, if certain faults are detected, the solenoid monitor 190 may be configured to trigger a shutdown of the engine 50. Thus, for example, some fault statuses may trigger messages and others may trigger engine shutdowns. Some fault statuses may trigger both messages and engine shutdowns.

Figure 3:
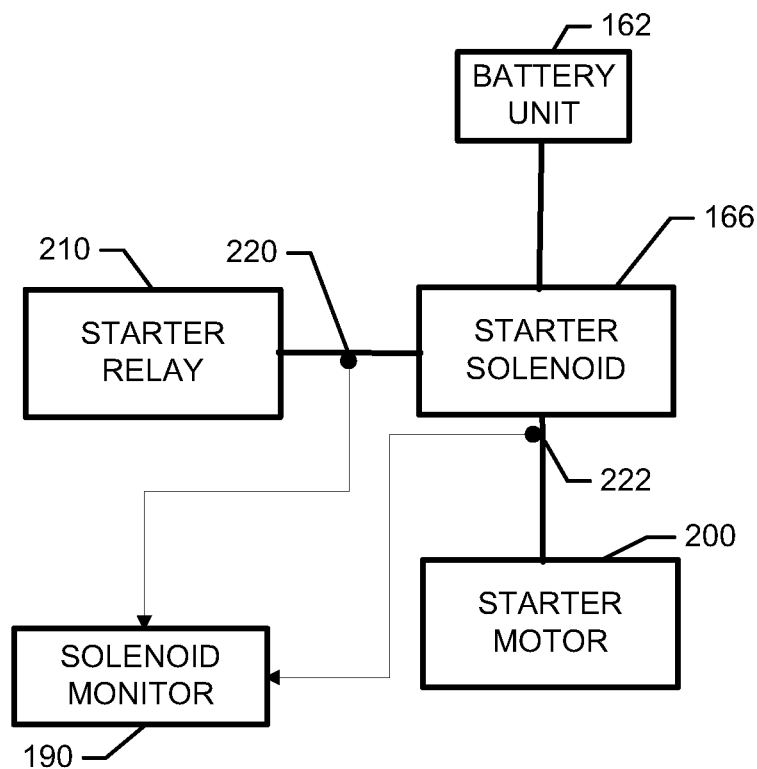
FIG. 3 illustrates a functional block diagram of a solenoid monitor according to an example embodiment.

FIG. 3 illustrates a block diagram showing more detail regarding how the solenoid monitor 190 may interface with the starter solenoid 166 in accordance with an example embodiment. In this regard, FIG. 3 illustrates how the starter solenoid 166 is inserted between the battery unit 162 and a starter motor 200 to apply voltage from the battery unit 162 to the starter motor 200 (for starting the engine 50) responsive to operation of the starter relay 210. Thus, when the user or operator attempts to start the engine 50 (e.g., with keyless or keyed operation), a starter relay 210 will be closed and apply current through an activation coil of the starter solenoid 166. Current through the activation coil of the starter solenoid 166 closes the circuit between the high voltage contact side of the battery unit 162, and the side of the starter solenoid 166 to which the starter motor 200 is connected in order to apply voltage to the starter motor 200 for starting the engine 50.

This normal operation of the ignition system 100 can be interrupted due to a number of faults, as mentioned above. However, the solenoid monitor 190 may be inserted as shown in FIG. 3 to monitor the health of the starter solenoid 166 and, in some cases, to enable identification of specific faults without sophisticated troubleshooting. In particular, the solenoid monitor 190 extracts data from two particular contacts of the starter solenoid 166 to conduct the monitoring activity described herein. For example, the solenoid monitor 190 may be operably coupled to a starter relay contact 220 of the starter solenoid 166. The starter relay contact 220 may be tapped off of the wire run or the actual contacts of the starter solenoid 166 that connect to the wire run that extends between the starter relay 210 and the starter solenoid 166. The solenoid monitor 190 may also be operably coupled to a starter motor contact 222 of the starter solenoid 166. The starter motor contact 222 may be on a starter motor-side of the starter solenoid 166. Thus, the starter motor contact 222 may be tapped off of the wire run or the actual contacts of the starter solenoid 166 that connect to the wire run that extends between the starter motor 200 and the starter solenoid 166.

Of note, the starter relay 210 is an example of a safety interlock system that may be used to actuate the starter solenoid 166. Other types of safety interlock systems may be alternatively employed in some other engine designs. For example, on some lawn tractors, the starter relay 210 may be replaced by one or more switches (e.g., safety switches) that may be used to control application of current to the activation coil of the starter solenoid 166. The operation of the switch or switches of the safety interlock system may therefore perform a similar function to the starter relay 210 and otherwise be similarly connected to the starter solenoid 166 relative to the connection shown in FIG. 3. Thus, when the safety interlock system includes one or more safety switches instead of the starter relay 210, the corresponding contact (i.e., the starter relay contact 220) should be understood to be an example of a safety interlock system contact.

Figure 4:
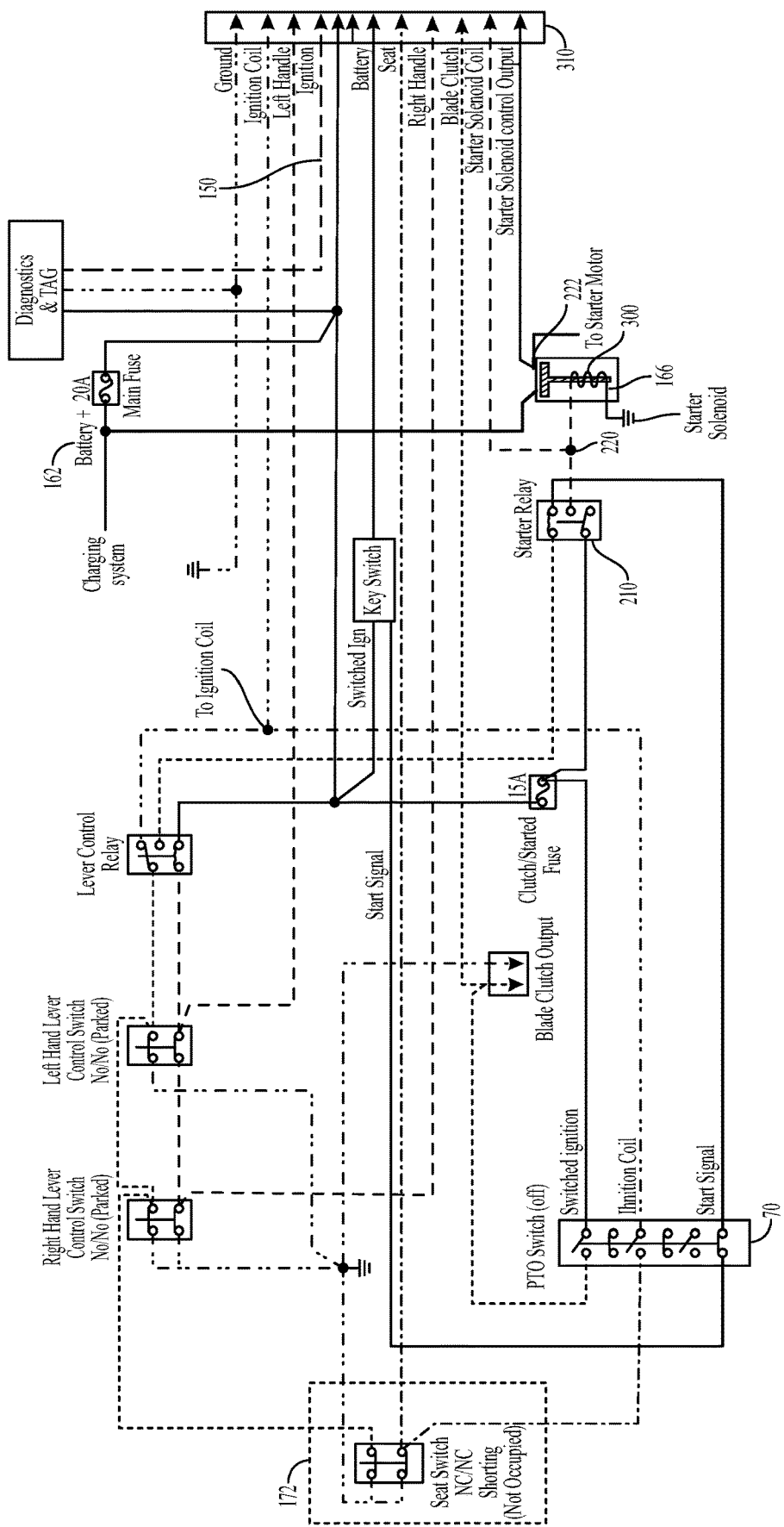
FIG. 4 illustrates a wiring diagram of an example implementation of wiring for providing the solenoid monitor according to an example embodiment.

FIG. 4 illustrates a wiring diagram of one example implementation for the basic block diagram shown in FIG. 3. FIG. 4 shows the starter relay 210, the starter solenoid 166 and the battery unit 162. FIG. 4 also shows the starter motor contact 222 and the starter relay contact 220 proximate to respective portions of the starter solenoid 166. However, FIG. 4 also shows the activation coil 300 of the starter solenoid 166, along with other example detailed components, some of which are shown in FIG. 2 (e.g., seat sensor 172, data bus 150 and PTO switch 70). FIG. 4 also shows various wire runs between several of the components shown and a pin connection assembly 310 of a chip (e.g., processor 112) associated with the ignition system 100. As shown in FIG. 4, the values detected at the starter motor contact 222 and the starter relay contact 220 may be communicated to the processor 112, at or via which the solenoid monitor 190 may be instantiated. The solenoid monitor 190 may utilize the values detected for calculations and determinations as described herein.

In this regard, for example, values (e.g., voltage and/or current) detected at the starter motor contact 222 and the starter relay contact 220 can be utilized by the solenoid monitor 190 to determine the fault status of the starter solenoid 166 as described herein. Thus, for example, the solenoid monitor 190 may be configured to compare voltage or current readings from the starter relay contact 220 and/or the starter motor contact 220 with each other or with other voltage or current levels associated with the ignition system 100 to determine specific fault statuses. The solenoid monitor 190 may then issue messages, warnings, or other indications based on the determined fault statutes (e.g., via the user interface 130, or via wireless communication to external devices).

The solenoid monitor 190 may be configured to, for example, monitor current of the electronic output driving the activation coil 300 to verify that a normal current is being applied to the activation coil 300. In particular, during a start attempt or start request, the solenoid monitor 190 may check the voltage or current measured at the starter motor contact 222 and the starter relay contact 220. It is assumed that the battery voltage (i.e., the output of the battery unit 162) is also already known. Thus, when a start attempt is received, the expectation is that the starter relay 210 will energize the activation coil 300 so that the battery voltage (or very nearly so—i.e., battery voltage minus the normal drop across the starter solenoid 166) is detected at the starter motor contact 222. If a normal starter motor start voltage (i.e., the battery voltage minus the normal drop across the starter solenoid 166) is detected during a start attempt, then it can be assumed that the starter solenoid 166 has functioned correctly responsive to successful activation of the activation coil 300. However, if a voltage other than the normal starter motor start voltage is detected, then a fault may exist. The value of the voltage detected at the starter motor contact 222 may help determine the exact nature of the fault.

For example, if the voltage detected at the starter motor contact 222 during the start attempt does not change relative to the voltage normally present at the starter motor contact 222 (i.e., when no start attempt is being made), then it can be assumed that the start attempt has not successfully activated the activation coil 300. In this regard, the failure to properly activate the activation coil 300 has prevented the battery voltage from being passed through the starter solenoid 166 to the starter motor 200. This could mean that the starter relay 210 is not functioning, or that there is a fault in the starter solenoid 166 itself. However, if the voltage detected at the starter motor contact 222 matches the voltage at the starter relay contact 220, then there is likely a short circuit between the starter relay contact 220 and the starter motor contact 222, and the exact nature of the fault is likely known. If the voltage detected at the starter motor contact 222 is some other value, then there is likely a fault of some other sort. For example, if the voltage detected is slightly lower than the normal starter motor start voltage, then dirty contacts, loose contacts, or some other fault may be causing a higher than normal voltage drop through the starter solenoid 166.

When the starter relay 210 is not activated (i.e., there is not currently a start attempt being made), an off-state starter relay voltage may be detected at the starter relay contact 220. When a start attempt is being made, the starter relay 210 may be activated and a normal starter relay voltage may be present at the starter relay contact 220. Accordingly, if the start attempt is being made and the voltage detected at the starter relay contact 220 does not change from the off-state starter relay voltage, then the starter relay 210 may be faulty or otherwise inoperable. But if the normal starter relay voltage is detected during the start attempt, then it can be assumed that the starter relay 210 is properly functioning and the proper voltage is being applied to the activation coil 300 for operation of the starter solenoid 166.

As can be appreciated from the discussion above, the values of voltage (and/or current) detected at the starter relay contact 220 and the starter motor contact 222 can be used to not only determine whether a fault exists, but also classify some faults. In an example embodiment, the solenoid monitor 190 may be configured to make a determination regarding fault status of the starter solenoid 166 (and therefore health status of the starter solenoid 166) each time a start attempt is initiated. The solenoid monitor 190 may, responsive to determining the fault status, provide an indication of a fault to the user (with or without code or identification information that specifies the nature of the fault) either directly through the device (i.e., through the user interface 130) or to an external device (e.g., a fleet management terminal or a computer or cell phone of the technician, operator or user) either through a wired or wireless connection. However, in some cases, (e.g., when a critical fault is detected), the solenoid monitor 190 may further be configured to ground the engine coil in order to stop the engine 50 from running. The solenoid monitor 190 may also be configured to log information regarding values detected at the start relay contact 220 and the starter motor contact 222 for each start attempt (e.g., in the memory 114). The logged information may be monitored over time for changes in values that may be indicative of an impending fault, or of preventative maintenance (e.g., cleaning contacts) that may be performed.

Figure 5:
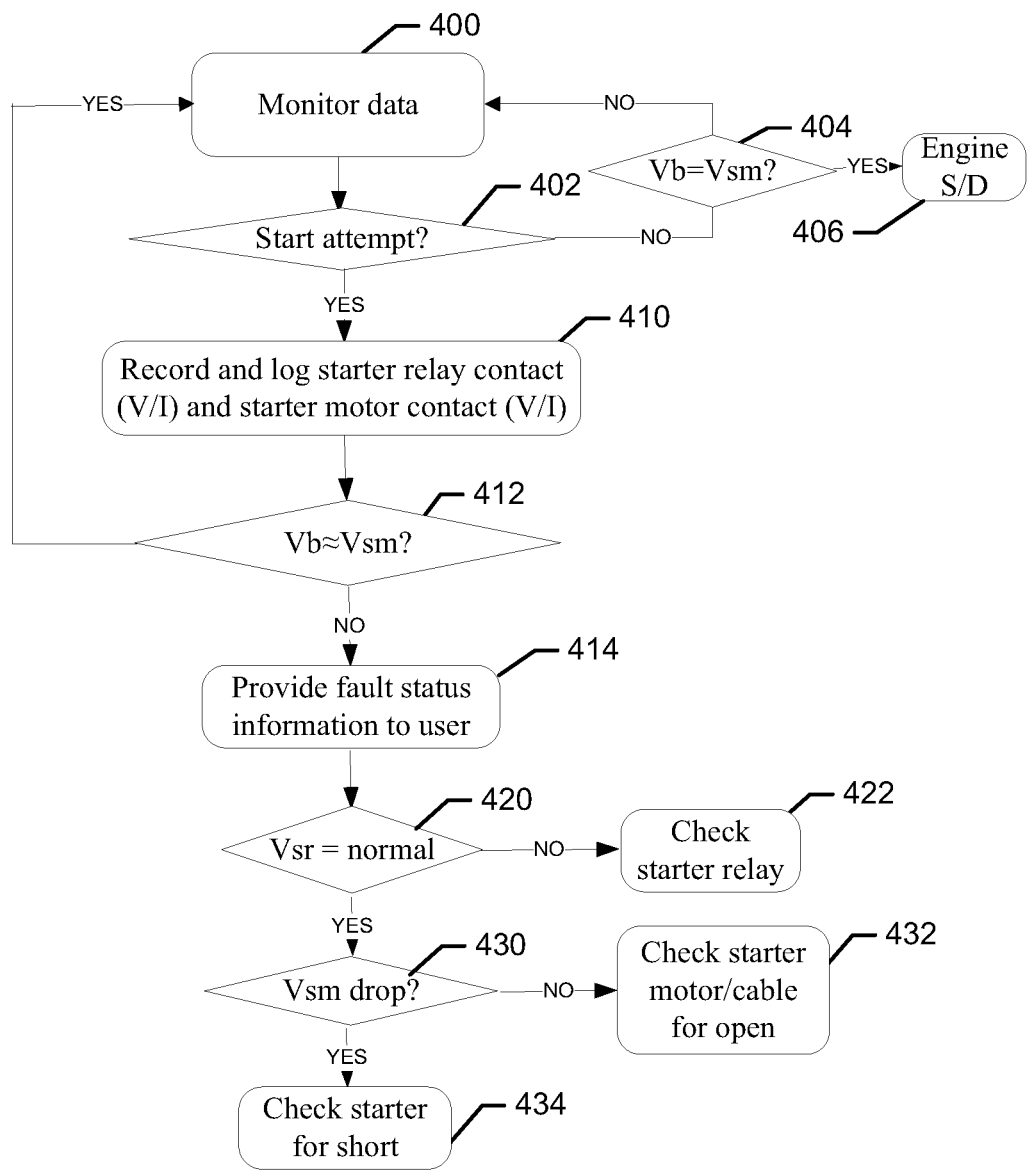
FIG. 5 illustrates a method of operation of a solenoid monitor according to an example embodiment.

FIG. 5 illustrates a flow chart for operation of the solenoid monitor 190 of one example embodiment relative to health monitoring of the starter solenoid 166. However, it should be appreciated that the solenoid monitor 190 could include additional, fewer or different operations in some alternative embodiments. Thus, the flow paths shown in FIG. 5 are merely non-limiting examples of one troubleshooting algorithm that the solenoid monitor 190 may employ.

Referring now to FIG. 5, the solenoid monitor 190 may be configured to monitor values (e.g., of voltage and/or current) of the battery unit 162 (e.g., Vb), at the starter relay contact 220 (e.g., Vsr) and at the starter motor contact 222 (e.g., Vsm) at operation 400. A determination may be made, at operation 402, as to whether a start attempt is detected. If no start attempt is detected, a comparison may be made between the voltage of the battery unit 162 (Vb) and the voltage at the starter motor contact 222 (Vsm) at operation 404. If these values are equal, then there is a critical fault (i.e., likely a stuck contact) that is communicating the Vb to the starter motor contact 222 even through the starter relay 210 is not activated. Accordingly, if Vb=Vsm at this stage, the engine may be automatically shut down at operation 406. If, as expected, Vb does not equal Vsm, then monitoring may continue at operation 400.

If, at operation 402, a start attempt was detected, then corresponding values (e.g., voltage (V) and/or current (I)) may be recorded for terminals of interest (e.g., the starter relay contact 220 and the starter motor contact 222) at operation 410. A determination may then be made at operation 412 as to whether Vb and Vsm are slightly different from each other. Vb and Vsm are expected to be slightly different from each other due to the voltage drop induced by current pulled through the starter motor 200. Thus, if this expectation is met (i.e., VbVsm), then flow returns to the monitoring of operation 400. However, if the expectation is not met, then this is an indication that a fault exists and fault status information (i.e., the existence of a fault) may be communicated to the user at operation 414.

In some cases, operation may stop with the user simply being informed of the existence of a fault associated with the starter solenoid 166. However, some embodiments may have automated troubleshooting capabilities such as those associated with the additional operations shown in FIG. 5. For example, a check may be made at operation 420 as to whether the voltage at the starter relay contact 220 (i.e., Vsr) is normal. If the voltage (i.e., Vsr) is not at a normal level, there may be a fault with the starter relay 210, and a check starter relay fault indication may be issued at operation 422. If the voltage is at a normal level, then the starter relay 210 likely operated properly during the start attempt at flow may continue to operation 430, where a check is made as to whether there is a drop at all in the Vsm. As noted above, a small drop is expected if the starter motor 200 pulls current when the starter solenoid 166 operates properly. If there is no drop at all (i.e., if Vsm=Vb), then current is not being pulled through the starter motor 200 even through the starter solenoid 166 has apparently closed (as expected) due to operation of the starter relay 210. This could indicate that the starter motor 200 has a fault, or the cable run to the starter motor 200 is loose or has experienced an open circuit. Thus, a check starter motor or starter motor cable indicator may be issued at operation 432.

If instead at operation 430, a determination is made that the Vsm did drop, and therefor had a larger drop than expected, the larger drop than expected may indicate that a short circuit exists in the starter motor 200. Such a short circuit could be causing much higher current pull than normal (and therefore also the larger voltage drop). Accordingly, an indication to check the starter for a short may then be issued at operation 434.

Accordingly, some example embodiments may include an ignition system for outdoor power equipment driven by a petrol or gasoline engine. The ignition system may include a safety interlock system (e.g., a starter relay), a starter motor, a starter solenoid having an activation coil, and a solenoid monitor. The ignition system may be configured to selectively apply power to start the engine based on application of a start attempt. The safety interlock system may be operable to actuate the starter solenoid via the activation coil to apply current to the starter motor for starting the engine during the start attempt. The solenoid monitor may be configured to determine a status of the activation coil and starter solenoid contacts (e.g., a starter motor contact and a safety interlock system contact) and provide a fault indication based on the status determined.

In some embodiments, the system may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the solenoid monitor may be configured to monitor for a critical fault when the start attempt is not applied and apply an engine shutdown in response to detection of the critical fault. In some cases, the solenoid monitor may be configured to apply the engine shutdown in response to determining that voltage at a starter motor contact of the starter solenoid is equal to battery voltage of the lawn care device when the start attempt is not applied. In an example embodiment, the solenoid monitor may be configured to determine the status of the activation coil based on a voltage detected at a safety interlock system contact (e.g., starter relay contact) of the starter solenoid. In some cases, the solenoid monitor may be configured to compare the voltage detected at the safety interlock system contact to a normal starting voltage for the safety interlock system contact to determine the status of the activation coil. In an example embodiment, the solenoid monitor may be configured to determine the status of the starter solenoid based on a voltage detected at a starter motor contact of the starter solenoid. In some cases, the solenoid monitor may be configured to determine the status of the starter solenoid based on an amount of voltage drop detected at the starter motor contact of the starter solenoid. In an example embodiment, the solenoid monitor may be configured to provide the fault indication via a user interface of the outdoor power equipment. In some cases, the solenoid monitor may be configured to provide the fault indication to user equipment via wireless transmission. In an example embodiment, the solenoid monitor may be configured to provide the fault indication in response to the start attempt.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. An ignition system for outdoor power equipment driven by a petrol or gasoline engine, the ignition system comprising:
   a safety interlock system;
   a starter motor;
   a starter solenoid having an activation coil; and
   a solenoid monitor,
   wherein the ignition system is configured to selectively apply power to start the engine based on application of a start attempt,
   wherein the safety interlock system is operable to actuate the starter solenoid via the activation coil to apply current to the starter motor for starting the engine during the start attempt, wherein the solenoid monitor is configured to determine a status of the activation coil and starter solenoid contacts and provide a fault indication based on the status determined, and wherein the solenoid monitor is configured to monitor for a critical fault when the start attempt is not applied and apply an engine shutdown in response to detection of the critical fault.

2. The ignition system of claim 1, wherein the solenoid monitor is configured to apply the engine shutdown in response to determining that voltage at a starter motor contact of the starter solenoid is equal to battery voltage of the lawn care device when the start attempt is not applied.

3. The ignition system of claim 1, wherein the solenoid monitor is configured to determine the status of the activation coil based on a voltage detected at a safety interlock system contact of the starter solenoid.

4. The ignition system of claim 1, wherein the solenoid monitor is configured to determine the status of the starter solenoid based on a voltage detected at a starter motor contact of the starter solenoid.

5. The ignition system of claim 4, wherein the solenoid monitor is configured to determine the status of the starter solenoid based on an amount of voltage drop detected at the starter motor contact of the starter solenoid.

6. The ignition system of claim 1, wherein the outdoor power equipment comprises a user interface, and wherein the solenoid monitor is configured to provide the fault indication via the user interface.

7. The ignition system of claim 1, wherein the solenoid monitor is configured to provide the fault indication to user equipment via wireless transmission.

8. The ignition system of claim 1, wherein the solenoid monitor is configured to provide the fault indication in response to the start attempt.

9. An ignition system for outdoor power equipment driven by a petrol or gasoline engine, the ignition system comprising:
   a safety interlock system;
   a starter motor;
   a starter solenoid having an activation coil; and
   a solenoid monitor,
   wherein the ignition system is configured to selectively apply power to start the engine based on application of a start attempt,
   wherein the safety interlock system is operable to actuate the starter solenoid via the activation coil to apply current to the starter motor for starting the engine during the start attempt,
   wherein the solenoid monitor is configured to determine a status of the activation coil and starter solenoid contacts and provide a fault indication based on the status determined,
   wherein the solenoid monitor is configured to determine the status of the activation coil based on a voltage detected at a safety interlock system contact of the starter solenoid, and
   wherein the solenoid monitor compares the voltage detected at the safety interlock system contact to a normal starting voltage for the safety interlock system contact to determine the status of the activation coil.

10. A lawn care device comprising:
    an engine to selectively power the device;
    a frame supporting the engine of the device; and
    an ignition system for selectively applying power to start the engine based on application of a start attempt,
    wherein the ignition system includes a safety interlock system, a starter motor and a starter solenoid having an activation coil,
    wherein the safety interlock system is operable to actuate the starter solenoid via the activation coil to apply current to the starter motor for starting the engine during the start attempt,
    wherein the ignition system further comprises a solenoid monitor configured to determine a status of the activation coil and starter solenoid contacts and provide a fault indication based on the status determined, and
    wherein the solenoid monitor is configured to monitor for a critical fault when the start attempt is not applied and apply an engine shutdown in response to detection of the critical fault.

11. The lawn care device of claim 10, wherein the solenoid monitor is configured to apply the engine shutdown in response to determining that voltage at a starter motor contact of the starter solenoid is equal to battery voltage of the lawn care device when the start attempt is not applied.

12. The lawn care device of claim 10, wherein the solenoid monitor is configured to determine the status of the activation coil based on a voltage detected at a safety interlock system contact of the starter solenoid.

13. The lawn care device of claim 12, wherein the solenoid monitor compares the voltage detected at the safety interlock system contact to a normal starting voltage for the safety interlock system contact to determine the status of the activation coil.

14. The lawn care device of claim 10, wherein the solenoid monitor is configured to determine the status of the starter solenoid based on a voltage detected at a starter motor contact of the starter solenoid.

15. The lawn care device of claim 14, wherein the solenoid monitor is configured to determine the status of the starter solenoid based on an amount of voltage drop detected at the starter motor contact of the starter solenoid.

16. The lawn care device of claim 10, wherein the solenoid monitor is configured to provide the fault indication via a user interface of the lawn care device.

17. The lawn care device of claim 10, wherein the solenoid monitor is configured to provide the fault indication to user equipment via wireless transmission.

18. The lawn care device of claim 10, wherein the solenoid monitor is configured to provide the fault indication in response to the start attempt.

\* \* \* \* \*